(No Model.)
H. S. LUCAS.
SAFETY DEVICE FOR EMERY WHEELS.
No. 286,210. Patented Oct. 9, 1883.
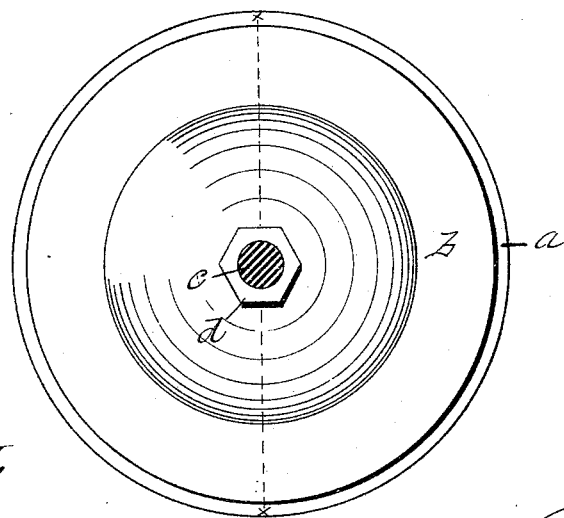
Fig I.
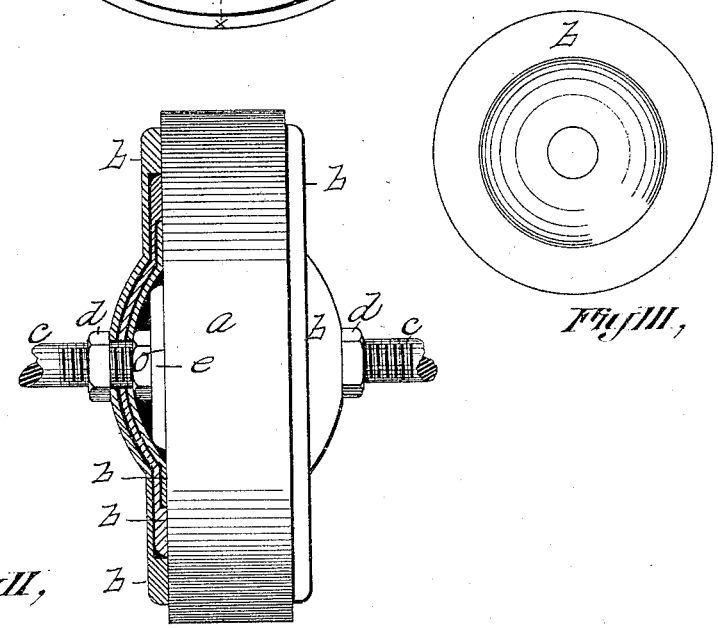
Fig II.
Fig III.
Witnesses,
R. F. Hyde
H. W. Lownds
Inventor,
Heman S. Lucas
by Henry A. Chapin
Atty

UNITED STATES PATENT OFFICE.

HEMAN S. LUCAS, OF CHESTER, MASSACHUSETTS.

SAFETY DEVICE FOR EMERY-WHEELS.

SPECIFICATION forming part of Letters Patent No. 286,210, dated October 9, 1883.

Application filed March 29, 1883. (No model.)

*To all whom it may concern:*

Be it known that I, HEMAN S. LUCAS, a citizen of the United States, residing at Chester, in the county of Hampden and State of Massachusetts, have invented new and useful Improvements in Safety Devices for Emery-Wheels, of which the following is a specification.

This invention relates to safety side-clamping devices to be applied to the opposite sides of a solid emery-wheel, to bind the wheel therebetween and to prevent it from breaking or bursting by reason of the centrifugal strain to which it is subjected when revolved rapidly; and the invention consists in providing one or more compression-shells, which are adapted to be applied and firmly secured against the opposite sides of such a wheel, outside and independent of the usual flanges and nuts by which said wheel is secured to its arbor, whereby that part of the wheel near its periphery is so clamped as to prevent its parts from separating and flying off under centrifugal strain.

In the drawings forming part of this specification, Figure I is a side view of an emery-wheel provided with my improvements. Fig. II is an edge view of a wheel, showing upon one side the compression-shells in section, about on the line $x\,x$, Fig. I. Fig. III is a plan view of a shell.

In the drawings, $c$ indicates the usual arbor, upon which an emery-wheel is mounted, and $e$ the ordinary side flange, and $o$ the nut, which is screwed against said flange, such a flange and nut being applied on each side of the wheel $a$, whereby the latter is secured to said arbor $c$. As commonly practiced, that portion of wheel $a$ outside of the border of flange $e$, or from said border to the periphery of wheel $a$, is left uncovered, and subject to any centrifugal strain upon it which the rapid rotation of the wheel may cause, whereby wheels are often caused to burst, with serious consequences.

To the emery-wheel, mounted in the ordinary way, as above described, I apply, on each side thereof, outside of the flange $e$ and nut $o$, one or more compression-shells, $b$, which are adapted to bear only against the side of the wheel, on that part thereof beyond the flange $e$. In practice I prefer to apply, according to the diameter of the wheel, from one to three or more shells, three being shown in Fig. II, arranged one over the other. The central portion of each shell is of concavo-convex form, to clear the nut and flange $o$ and $e$, and beyond said central form is a flat-faced border to bear against the side of the wheel. A nut, $d$, on the shaft $c$ is turned against the shell to force the latter firmly against the wheel.

The shells $b$, when applied one over the other, as in Fig. II, are made of such form that those outside of the inner one extend, in succession, one beyond the other, taking bearings on the side of the wheel at different distances from its center. Thus when a wheel, as in said Fig. II, is provided with three shells, the first one may be removed when the wheel is worn nearly or quite down to the periphery of said shell, and so each succeeding shell may be removed as the wheel becomes worn. The said shells $b$ may be made of metal or wood, or any other suitable material, and the said concavo-convex portion thereof may consist of a continuous face, or have arms radiating from its center to the flat-faced border. When the shells are made of metal, their construction with said arms will conduce to greater lightness.

If desired, any suitable frictional material—such as rubber or paper in the form of wide gaskets—may be placed between the faces of said compression-shells and the sides of the wheel.

What I claim as my invention is—

The combination, with an emery-wheel and its arbor, of a series of compression-shells adapted to be clamped against the opposite sides of said wheel, each of said shells having a bearing on said wheel beyond the edge of the shell next within it, substantially as and for the purpose set forth.

HEMAN S. LUCAS.

Witnesses:
H. A. CHAPIN,
H. W. LOOMIS.